United States Patent
Jiang et al.

(10) Patent No.: US 8,329,255 B2
(45) Date of Patent: Dec. 11, 2012

(54) DURABLE NON-FLUORINE WATER REPELLENT AGENT AND PROCESS FOR PREPARING SAME

(75) Inventors: Wanchao Jiang, Shanghai (CN); Yong Long, Shanghai (CN); Shingo Tabei, Shanghai (CN); Uche Kelechi Anyanwu, Hastings-on-Hudson, NY (US); Mark D. Leatherman, Stamford, CT (US); Zhipeng Zheng, Shanghai (CN)

(73) Assignee: Momentive Performance Materials Inc., Albany, NY (US)

(*) Notice: Subject to any disclaimer, the term of this patent is extended or adjusted under 35 U.S.C. 154(b) by 9 days.

(21) Appl. No.: 12/940,466

(22) Filed: Nov. 5, 2010

(65) Prior Publication Data

US 2012/0114928 A1  May 10, 2012

(51) Int. Cl.
*D06M 15/643* (2006.01)
*C08G 77/14* (2006.01)
*C08G 77/26* (2006.01)

(52) U.S. Cl. .......... 427/387; 428/447; 428/452; 528/34; 528/38; 528/40; 252/8.61; 252/8.62

(58) Field of Classification Search .................. None
See application file for complete search history.

(56) References Cited

U.S. PATENT DOCUMENTS

| | | | |
|---|---|---|---|
| 3,655,420 A * | 4/1972 | Tichenor | 428/391 |
| 4,359,545 A | 11/1982 | Ona et al. | |
| 4,757,121 A | 7/1988 | Tanaka et al. | |
| 5,000,861 A * | 3/1991 | Yang | 428/391 |
| 5,025,076 A * | 6/1991 | Tanaka et al. | 528/33 |
| 5,236,465 A | 8/1993 | Ohashi et al. | |
| 5,395,549 A | 3/1995 | Ozaki et al. | |
| 5,668,078 A * | 9/1997 | Sumiya et al. | 502/402 |
| 7,178,919 B2 * | 2/2007 | Kato et al. | 351/159.57 |
| 2007/0059537 A1 | 3/2007 | Hupfield | |
| 2007/0213492 A1 | 9/2007 | Mowrer et al. | |
| 2009/0118421 A1 | 5/2009 | Falk | |

FOREIGN PATENT DOCUMENTS

| | | | |
|---|---|---|---|
| EP | 0530718 A1 | | 3/1993 |
| EP | 1096059 | * | 5/2001 |
| JP | 52091998 A | | 8/1977 |
| JP | 03234877 A | | 10/1991 |
| JP | 5214216 A | | 8/1993 |
| JP | 07-145241 A | * | 6/1995 |
| JP | 8311777 A | | 11/1996 |
| JP | 11158779 A | | 6/1999 |
| JP | 2000192371 A | | 7/2000 |
| JP | 2002194675 A | | 7/2002 |
| JP | 2004-059609 | * | 2/2004 |
| JP | 2004059609 A | | 2/2004 |
| JP | 2010144277 A | | 7/2010 |

OTHER PUBLICATIONS

Machine-generated translation of JP 2004-059609 (Feb. 2004).*
Abstract for JP 2004-059609 (Feb. 2004).*
Abstract for JP 02-068303 A (Mar. 7, 1990).*

* cited by examiner

*Primary Examiner* — Marc Zimmer
(74) *Attorney, Agent, or Firm* — Dominick G. Vicari; Kenneth S. Wheelock

(57) ABSTRACT

The present invention provides a crosslinkable polysiloxane-containing composition and a process for treating a textile with the composition whereby desirable properties, such as water repellency and durability, are enhanced.

24 Claims, No Drawings

DURABLE NON-FLUORINE WATER REPELLENT AGENT AND PROCESS FOR PREPARING SAME

FIELD OF THE INVENTION

The present invention provides a novel crosslinkable polysiloxane-containing composition and a process for treating a textile with the composition whereby desirable properties, such as water repellency and durability, are enhanced.

BACKGROUND OF THE INVENTION

Various agents consisting of organopolysiloxanes and silicone compound compositions have been proposed in attempts to impart a variety of valuable properties to textile fibers, such as water repellency, softness, lubricity, anti-pilling, good laundry and dry cleaning durability, and the like. There continues to be a need to improve these and other desirable properties of the textiles. In particular, there is increasing demand of textiles with excellent water repellency.

It is generally known that water repellent fluoroacrylates can be undesirable and may bioaccumulate in living organisms due to fluorinated groups. Currently, fluorinated water repellent agents predominate the market and most are long chain perfluorinated group-containing compounds (8 carbon atoms). There have been attempts to replace those long chain perfluorinated group-containing compounds with short-chain fluorocarbons; however, it is unclear if short perfluorinated group-containing compounds avoid undesirable features. Compared to such fluorine compounds, silicones are more desirable and have a lower surface tension to impart water repellency. Thus, conventional amino silicones, epoxy modified silicones, hydrogen silicones and silanols have been proposed to replace fluorocarbon water repellent agents, but have demonstrated inferior initial water repellency and lower washing fastness.

SUMMARY OF THE INVENTION

The present invention fulfills the need for silicone emulsions that impart superior initial water repellency and excellent washing fastness to textiles without using harmful fluorinated groups.

In accordance with the present invention, there is provided a crosslinkable polysiloxane-containing composition comprising:
(a) at least one polysiloxane selected from the group consisting of
polysiloxane of formula (1):

$$M^A{}_a D^B{}_b D^C{}_c T^D{}_d T^E{}_e M^A{}_a \quad (1)$$

wherein
$M^A = (OR^1)_y(R^2)_{3-y}SiO_{1/2}$;
$D^B = R^3{}_2 SiO_{2/2}$;
$D^C = R^4 R^5 SiO_{2/2}$;
$T^D = R^6 SiO_{3/2}$; and,
$T^E = R^7 SiO_{3/2}$;
wherein
$R^1$ is hydrogen or a monovalent hydrocarbon group of 1-20 carbon atoms;
$R^2$, $R^3$, $R^4$ and $R^6$ each independently is a monovalent hydrocarbon or alkoxy group of 1-60 carbon atoms;
$R^5$ and $R^7$ each independently is a monovalent hydrocarbon group of 1-60 carbon atoms and substituted with at least one amino and/or oxirane group; and, a, b, c, d and e each independently is 0 or a positive integer, provided that $2 \leq a \leq 19$, $1 \leq b \leq 9999$, $1 \leq c \leq 19$, $0 \leq d \leq 9$, $0 \leq e \leq 9$ and $0 \leq y \leq 3$, and polysiloxane of formula (2) which is the reaction product of:
(i) at least one compound possessing at least two oxirane groups, a compound possessing at least two oxetane groups, or a compound possessing at least one oxirane group and at least one oxetane group, and
(ii) at least one aminosilane of the formula:

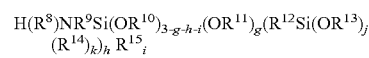

wherein
$R^8$ is hydrogen or a monovalent hydrocarbon group of 1-20 carbon atoms;
$R^9$ is a divalent hydrocarbon group of 1-60 carbon atoms;
$R^{11}$ is a monovalent hydrocarbon group of 3-200 carbon atoms;
$R^{12}$ is oxygen or a divalent hydrocarbon group of 1-60 carbon atoms;
$R^{10}$, $R^{13}$, $R^{14}$ and $R^{15}$ each independently is a monovalent hydrocarbon group of 1-200 carbon atoms;
g, h and i each independently is 0-3, subject to the limitation that $(g+h+i) \leq 3$; and
j and k each independently is 0-3, subject to the limitation that $(j+k)=3$; and,
(b) at least one crosslinker.

The invention further provides a process of treating a textile comprising:
(a) applying to a textile at least one crosslinkable polysiloxane-containing composition, such as described above; and,
(b) subjecting the at least one crosslinkable polysiloxane-containing composition to crosslinking conditions to provide a crosslinked polysiloxane-containing composition on the textile,
whereby the textile has enhanced durability and water repellency.

The novel polysiloxane-containing composition of the present invention provides high molecular weight silicone polymers functionalized with reactive alkoxysilane groups. Further, the aminosilicone emulsion system in the present invention is positively charged, compared to non-ionic or anionic systems, and thus, more easily absorbed by the negatively charged fibers of textiles. The reactive silane groups allow these polymers to form networked polymer systems via self-condensation of alkoxysilyl groups, which provides durable film coverage of treated textile fibers. Further, the composition of the present invention promotes crosslinking and thus, reinforces textile water repellency by forming a coherent and robust water repellent membrane on textile surfaces. The reinforcement of textile water repellency occurs via chemiabsorption, e.g., by carbamate links, between the membrane and textile fibers to impart superior washing durability.

DESCRIPTION OF THE INVENTION

As used herein, approximating language may be applied to modify a representation that may vary without resulting in a change in the basic function to which it is related. Accordingly, a description or value modified by a term or terms, such as "substantially" may not to be limited to the precise description or value specified, in some cases. All ranges in the specifications and claims are inclusive of the endpoints and independently combinable. Numerical values in the specifications and claims are not limited to the specified values and may include values that differ from the specified value. Numerical values are understood to be sufficiently imprecise to include values approximating the stated values, allowing for experimental errors due to the measurement techniques known in the art and/or the precision of an instrument used to determine the values.

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all sub-ranges within that range and any combination of the various endpoints of such ranges or subranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The crosslinkable polysiloxane-containing composition of the present invention comprises:
(a) at least one polysiloxane selected from the group consisting of
polysiloxane of formula (1):

wherein
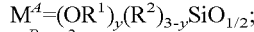
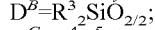
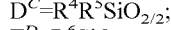
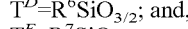
wherein
$R^1$ is hydrogen or a monovalent hydrocarbon group of 1-20 carbon atoms;
$R^2$, $R^3$, $R^4$ and $R^6$ each independently is a monovalent hydrocarbon or alkoxy group of 1-60 carbon atoms;
$R^5$ and $R^7$ each independently is a monovalent hydrocarbon group of 1-60 carbon atoms and substituted with at least one amino and/or oxirane group; and,
a, b, c, d and e each independently is 0 or a positive integer, provided that $2 \leq a \leq 19$, $1 \leq b \leq 9999$, $1 \leq c \leq 19$, $0 \leq d \leq 9$, $0 \leq e \leq 9$ and $0 a \leq y \leq 3$,
and polysiloxane of formula (2) which is the reaction product of:
(i) at least one compound possessing at least two oxirane groups, a compound possessing at least two oxetane groups, or a compound possessing at least one oxirane group and at least one oxetane group, and
(ii) at least one aminosilane of the formula:

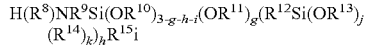

wherein
$R^8$ is hydrogen or a monovalent hydrocarbon group of 1-20 carbon atoms;
$R^9$ is a divalent hydrocarbon group of 1-60 carbon atoms;
$R^{11}$ is a monovalent hydrocarbon group of 3-200 carbon atoms;
$R^{12}$ is oxygen or a divalent hydrocarbon group of 1-60 carbon atoms;
$R^{10}$, $R^{13}$, $R^{14}$ and $R^{15}$ (each independently is a monovalent hydrocarbon group of 1-200 carbon atoms;

g, h and i each independently is 0-3, subject to the limitation that $(g+h+i) \leq 3$; and j and k each independently is 0-3, subject to the limitation that $(j+k)=3$; and,
(b) at least one crosslinker.

According to one embodiment herein, the crosslinkable polysiloxane-containing composition is a reactive silicone polymer composition comprising an amino-modified emulsion polymerized silicone and a crosslinker. According to another embodiment herein, the crosslinkable polysiloxane-containing composition is a reactive silicone polymer composition comprising a linear random block amino-functional silicone-polyether copolymer and a crosslinker.

According to one embodiment herein, the aqueous silicone-containing emulsion is prepared by the copolymerization of cyclic and/or linear siloxanes and alkoxy functional silanes in a surfactant medium that allows for emulsification of the polymerized and cross-linked organo-functional silicones of the final product.

According to one embodiment herein, the composition is an aqueous emulsion comprising at least one polysiloxane of formula (1) and polysiloxane of formula (2), at least one crosslinker, water and at least one surfactant. According to another embodiment herein, the composition is an aqueous emulsion comprising at least one polysiloxane of formulas (1) and (2) and at least one crosslinker.

According to one embodiment herein, polysiloxanes of formula (1) are obtained from the copolymerization of at least one cyclic silicone monomer and at least one amino-functional silane. Suitable cyclic monomers are hexamethylcyclotrisiloxane, octamethylcyclotetrasiloxane, decamethylcyclopentasiloxane, dodecamethylcyclohexasiloxane, and the like. Suitable amino-functional silane monomers are aminopropyltrimethoxysilane, aminopropyldimethoxymethylsilane, aminopropyltriethoxysilane, and the like.

Polysiloxanes of formula (2) are described in U.S. Patent Application Publication No. US 2009/0118421 the disclosure of which is hereby specifically incorporated by reference. According to one embodiment herein, polysiloxanes of formula (2) are obtained from the copolymerization of at least one epoxy monomer and at least one amino-functional silane. Suitable epoxy monomers are polydimethylsiloxane diglycidyl ether, polyethylene glycol diglycidyl ether, polypropylene glycol diglycidyl ether, polyethylene diglycidyl ether, polybutadiene diglycidyl ether or a mixture thereof. Suitable amino-functional silane monomers are aminopropyl triisopropoxy silane, aminopropyl diisopropoxy methylsilane and the like, and mixtures thereof. The polysiloxanes of formula (2) may optionally include non-silane-containing amine groups, such as hexylamine, octylamine, ethanolamine, diethylaminopyopyl amine, and the like.

It is preferable that polysiloxanes of formulas (1) or (2) each have number-average molecular weights of about 100 to about 200,000, and preferably, about 1000 to 100,000. It is preferable that crosslinker (b) has a number-average molecular weight of about 100 to about 200,000, and more preferably, about 1000 to 100,000.

$R^1$ is hydrogen or a monovalent hydrocarbon group of 1-20 carbon atoms. When $R^1$ is a monovalent hydrocarbon group, it can preferably have 1-6 carbon atoms, and more preferably 1-4 carbon atoms.

Each $R^2$, $R^3$, $R^4$, and $R^6$ independently is a monovalent linear or branched hydrocarbon or alkoxy group of 1-60 carbon atoms. Preferably, each $R^2$, $R^3$, $R^4$, and $R^6$ independently is a monovalent hydrocarbon or alkoxy group of 1-6 carbon atoms, e.g., methoxy, ethoxy, propoxy, butoxy, pentoxy, and isomers thereof, and more preferably, each independently is a monovalent hydrocarbon or alkoxy group of 1-4 carbon atoms, e.g., methoxy, ethoxy, propoxy, butoxy, and isomers thereof.

Each $R^5$ and $R^7$ independently is a monovalent linear or branched hydrocarbon group of 1-60 carbon atoms and substituted with at least one amino and/or oxirane group. Preferably, each $R^5$ and $R^7$ independently is a monovalent linear or branched hydrocarbon group of 2-20 carbon atoms, and more preferably, 2-10 carbon atoms.

$R^8$ is hydrogen or a monovalent linear or branched hydrocarbon group of 1-20 carbon atoms. Preferably, $R^8$ is hydrogen or a monovalent hydrocarbon group of 1-4 carbon atoms, and more preferably, $R^8$ is hydrogen.

$R^9$ is a divalent linear or branched hydrocarbon group of 1-60 carbon atoms. Preferably, $R^9$ a divalent linear hydrocarbon group of 2-8 carbon atoms, and more preferably, $R^9$ is a divalent linear hydrocarbon group of 3-5 carbon atoms.

Each $R^{10}$, $R^{13}$, $R^{14}$ and $R^{15}$ independently is a monovalent linear or branched hydrocarbon group of 1-200 carbon atoms. Preferably, each $R^{10}$, $R^{13}$, $R^{14}$ and $R^{15}$ independently is a monovalent linear or branched hydrocarbon group of 1-15 carbon atoms, and more preferably, each $R^{10}$, $R^{14}R^{13}$, $R^{14}$ and $R^{15}$ independently is a monovalent linear or branched hydrocarbon group of 2-8 carbon atoms.

$R^{11}$ is a linear or branched hydrocarbon group of 3-200 carbon atoms. Preferably, $R^{11}$ is a monovalent linear or branched hydrocarbon group of 3-8 carbon atoms, and more preferably, $R^{11}$ is a monovalent linear or branched hydrocarbon group of 3-5 carbon atoms.

$R^{12}$ is oxygen or a divalent linear or branched hydrocarbon group of 1-60 carbon atoms. Preferably, $R^{12}$ is oxygen or a divalent linear or branched hydrocarbon group of 2-20 carbon atoms, and more preferably, $R^{12}$ is a divalent linear or branched hydrocarbon group of 2-10 carbon atoms.

Values for a, b, c, d and e each independently is 0 or a positive integer, provided that $2 \leq a \leq 19$, $1 \leq b \leq 9999$, $1 \leq c \leq 19$, $0 \leq d \leq 9$, $0a \leq e \leq 9$, and $0a \leq y \leq 3$. Preferably, $2a \leq a \leq 9$, $25 \leq b \leq 999$, $1 \leq c \leq 9$, $0 \leq d \leq 5$, $0 \leq e \leq 5$, and $0 < y \leq 2$. More preferably, $2 \leq a \leq 5$, $100 \leq b \leq 999$, $1 \leq c \leq 7$, $0 \leq d \leq 3$, $0 \leq e \leq 3$, and $0 < y \leq 1$.

Values for g, h and i each independently is 0 to about 3, subject to the limitation that $(g+h+i) \leq 3$. Values for g are preferably about 2 to about 3. The value for h is preferably 0. A value for i is preferably 0 to about 1.

Values for j and k are each independently 0 to about 3, subject to the limitation that $(j+k)=3$.

Polysiloxane of formula (1) is advantageously present in the aqueous emulsion in a range of from about 1 weight percent (wt. %) to about 80 wt. %, preferably from about 5 wt. % to about 40 wt. % based on the total weight of polysiloxane (a) and crosslinker (b).

Polysiloxane of formula (2) is advantageously present in the aqueous emulsion in a range of from about 1 wt. % to about 80 wt. %, preferably from about 5 wt. % to about 40 wt. % based on the total weight of polysiloxane (a) and crosslinker (b).

Crosslinker (b) is advantageously present in the aqueous emulsion in a range of from about 0.1 wt. % to about 30 wt. %, preferably from about 0.5 wt. % to about 20 wt. % based on the total weight of polysiloxane (a) and crosslinker (b).

Crosslinker (b) is advantageously present in the aqueous emulsion in a range of from about 0.1 wt. % to about 30 wt. %, preferably from about 0.1 wt. % to about 20 wt. % based on the total weight of polysiloxane (b) and crosslinker (b).

As a result of the polymerization and cross-linking reaction occurring in the same medium, the reaction does not require stripping solvents, alcohols, viscosity modifiers, or other undesired diluents, and the produced emulsion provides a composition that is stable to separation of the oil phase over extended storage periods.

In a particular embodiment, the present invention provides a process for producing polymerized and cross-linked silicone fluids by: (1) mixing cyclic and/or linear siloxanes as monomer with alkoxy-terminated functional silane, an optional catalyst, and at least one surfactant that contains at least one cationic surfactant and at least one nonionic surfactant; (2) heating the mixture of (1) to a temperature appropriate for the ring opening reaction of the cyclic polysiloxane monomer, and maintaining the temperature for an appropriate time until the ring opening reaction is completed and condensation between the cross-linking agents and the produced silanols occurs; (3) cooling the mixture of (2) down to about 20-25° C. and adding the bi-ethoxy or bi-methoxy silane as chain extender for the condensation of linear/crosslinked silicone to provide a high molecule weight polymer; (4) adding additionally tri-ethoxy or tri-methoxy terminated functional silane is added to the contents of the silicone mixture to increase the crosslinking level; and (5) terminating the polymerization reaction by the addition of an acid to form the final product According to one embodiment herein, the cyclic siloxanes include those of the general formula:

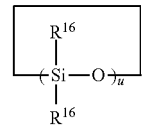

wherein u represents an integer of about 3 to about 9, preferably about 4 to about 7; and $R^{16}$ is independently selected from the group consisting of alkyl groups and aryl groups, containing up to about 12 carbon atoms. Preferably, $R^{16}$ is independently selected from the group consisting of a saturated linear hydrocarbon group of about 1 to about 10 carbon atoms, a saturated branched hydrocarbon group of about 1 to about 10 carbon atoms, a substituted aromatic hydrocarbon group of about 6 to about 12 carbon atoms, a saturated cycloaliphatic hydrocarbon group of about 3 to about 10 carbon atoms, and combinations thereof. Most preferably, $R^{16}$ is independently selected from the group consisting of methyl and phenyl.

Examples of other cyclic siloxanes useful for the subject polymerization include the cyclic polydimethylcyclosiloxanes wherein u represents an integer of about 3 to about 9, preferably about 4 to about 7. The cyclic siloxanes include those in which u is 4 to 5, are also known as octamethylcyclotetrasiloxane (commonly referred to as "$D_4$"), and decamethylcyclopentasiloxane ("$D_5$"), respectively. These materials are available from Momentive Performance Materials as SF1173 ($D_4$) and SF1202 ($D_5$), as well as blends thereof. According to one embodiment herein, mixtures of the straight-chain and cyclic dimethyl siloxanes are also useful in preparing the aqueous silicone-containing emulsion of the present invention.

According to one specific embodiment herein, the cyclic siloxanes as oligomers include such oligomers as hexamethylcyclotrisiloxane ($D_3$), Octamethylcyclotetrasiloxane ($D_4$), Decamethylcyclopentasiloxane ($D_5$), dodecamethylcyclohexasiloxane ($D_6$), tetradecamethylcycloheptasiloxane ($D_7$) and mixtures thereof.

According to one embodiment herein, cyclic siloxane are the preferable monomers to prepare the minimally crosslinked two-dimensional structures. However, it is recognized that low molecular weight polysilanol compounds can be used in addition to or in place of the cyclic siloxanes as the monomers of the inventive aqueous silicone-containing emulsion. According to one embodiment herein, low molecular weight polysilanols that can be use in the aqueous silicone-containing emulsion include those of the general formula:

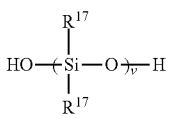

wherein v represents an integer of about 3 to about 9, preferably about 4 to about 7, wherein $R^{17}$ is independently selected from the group consisting of 1 to about 10 carbon atom saturated linear hydrocarbon groups, 1 to about 10 carbon atoms saturated branched hydrocarbon groups, about 6 to about 12 carbon atom substituted aromatic hydrocarbon groups, about 3 to about 10 carbon atom saturated cycloaliphatic hydrocarbon groups, and combinations thereof. Most preferably, $R^{17}$ is independently selected from the group consisting of methyl and phenyl.

According to another embodiment herein, low molecular weight polysilanols that can be use in the aqueous silicone-containing emulsion include those having the formula:

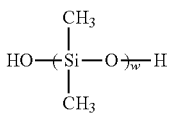

wherein w is an integer and w is greater than or equal to 3 and less than or equal 30.

Alkoxy silanes useful herein include a bi-alkoxy silane represented by the formula: $R^{18}R^{19}Si(OR^{20})_2$ and tri-alkoxy silane represented by the formula: $R^{19}Si(OR^{20})_3$, wherein $R^{18}$ and $R^{20}$ are unsubstituted alkyl group of the general formula: $C_tH_{2t+1}$, wherein t is an integer from 1 to 6, and $R^{19}$ is a hydrocarbon group of about 2 to about 10 carbon atoms containing functional groups such as amine or epoxy. Preferably, $R^{19}$ is a hydrocarbon group of about 2 to about 4 carbon atoms containing functional groups such as amine or epoxy.

Specific alkoxy silanes useful include, but are not limited to, N-beta-(aminoethyl)-gamma-aminopropyl methyl dimethoxy silane, methyl trimethoxy silane, methyl triethoxy silane, gamma-glycidoxypropyl trimethoxy silane, beta-(3,4-epoxycyclohexyl)ethyl timethoxy silane, gamma-aminopropyl trimethoxy silane, aminopropyl triisopropoxy silane and mixtures thereof.

A siloxane polymerization catalyst is used to prepare the polymerized and cross-linked organo-functional silicones of the final product. The polymerization catalysts useful in the present invention include strong bases such as quaternary ammonium hydroxides, and metal hydroxides such as potassium hydroxide, sodium hydroxide, cesium hydroxide and lithium hydroxide. Some examples of suitable quaternary ammonium hydroxides include but are not limited to octadecyl trimethyl ammonium hydroxide, hexadecyl trimethyl ammonium hydroxide, and tallow trimethyl ammonium hydroxide. Base catalysts such as sodium hydroxide that are not also surfactants cause in situ ion exchange with quaternary ammonium salts to form quaternary ammonium hydroxides. Preferably, the catalyst is provided in a separate aqueous solution.

The catalyst is employed in the emulsions herein in a range of from about 0.1 wt. % to about 30 wt. %, and preferably from about 0.1 wt. % to about 20 wt. %, based on a total weight of the at least one polysiloxane and crosslinker.

An aqueous emulsion of the composition of the present invention can be prepared by high shear mixing or agitation to give a good mixture of water with compounds (a) and (b). Surfactants, or emulsifiers, known in the art, can also be added to the aqueous emulsion.

The surface active agents used in the preparation of the aqueous emulsion include, but are not limited to,
1) non-ionic surfactants, such as polyoxyethylene alkyl ethers, polyoxyethylene alkylphenyl ethers, sorbitan fatty acid esters, glycerine fatty acid esters, and the like;
2) anionic surfactants, such as sodium lauryl sulfate, sodium dodecylbenzene sulfonate, sodium polyoxyethylene ether carboxylate, and the like; and
3) cationic surfactants, such as quaternary ammonium salts and the like.

The above-mentioned surfactants can be used either singly or as a combination of two or more kinds. It is preferable to use cationic and nonionic surfactants to form a positively charged amino silicone emulsion, as opposed to non-ionic or anionic systems, to promote absorption of the emulsion by negatively charged fibers of textiles.

According to one embodiment herein, the surfactant comprises both a cationic surfactant and a non-ionic surfactant. Cationic surfactants useful herein are those known in the art to be useful in stabilization of emulsions produced via emulsion polymerization. These cationic surfactants include, but are not limited to, various quaternary ammonium salts represented by the general formula:

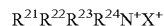

wherein $R^{21}$ to $R^{24}$ are each independently alkyl groups containing from 1 to 30 carbon atoms, or alkyl groups derived from tallow, coconut oil, or soy, and X is acetate, hydroxide or halogen, e.g., chlorine or bromine.

Cationic surfactants useful herein include, but are not limited to, aliphatic fatty amines and their derivatives such as dodecylamine acetate, octadecylamine acetate and acetates of amines of tallow fatty acids; quaternary ammonium compounds such as tallow trimethyl ammonium chloride, dioctadecyl dimethyl ammonium chloride, didodecyldimethyl ammonium chloride and dihexadecyldimethyl ammonium chloride and the like.

The nonionic surfactants of the present are known in the art. Useful nonionic surfactants include those of the general formula:

wherein $R^{25}$ is a long chain alkyl group and $R^{26}$ is hydrogen, or $CH_3$ and L is greater than or equal to 3 and less than or equal to 50.

Nonionic surfactants useful in the method herein are those that have a hydrophilic-lipophilic balance (HLB) between 10 and 20. The preferable nonionic surfactants are those, which are stable in the polymerization environment.

Specific nonionic surfactants useful herein include, but are not limited to the following: 2,6,8-trimethyl-4-nonyloxy-polyethylene oxyethanol (6EO) (available as TERGITOL TMN-6 by DOW CHEMICAL); 2,6,8-trimethyl-4-nonyloxypolyethylene oxyethanol (10EO) (available as TERGITOL TMN-10 by DOW CHEMICAL); alkyleneoxypolyethyleneoxyethanol (C 11-15, secondary alkyl, 7EO) (available as TERGITOL 15-S-7 by DOW CHEMICAL); alkyleneoxypolyethyleneoxyethanol (C 11-15, secondary alkyl, 9EO) (available as TERGITOL 15-S-9 by DOW CHEMICAL); alkyleneoxypolyethyleneoxyethanol (C 11-15, secondary alkyl, 15EO) (available as TERGITOL 15-S-15 by DOW CHEMICAL).

According to one embodiment herein, based on percentage by weight of the total emulsion solution the cyclic and/or linear siloxane(s) typically range in amount from about 10 wt. % to about 70 wt. % of the total emulsion solution. According to another specific embodiment herein, the cyclic siloxane(s) range in amount from about 25 wt. % to about 60 wt. % of the total emulsion solution.

According to another embodiment herein, the tri-alkoxy silane ranges in amount from 0.01 wt. % to about 5 wt. % of the total emulsion composition, and in one specific embodiment the tri-alkoxy silane ranges in amount from about 0.1 wt. % to about 3 wt. % of the total emulsion composition.

In one embodiment herein the bi-alkoxy silane ranges in amount from 0.01 wt. % to about 5 wt. % of the total emulsion solution and in another embodiment from about 0.1 wt. % to about 3 wt. % of the total emulsion solution.

According to one embodiment herein, the emulsion-forming amount of at least one surfactant of at least one cationic surfactant and at least one nonionic surfactant ranges in amount from greater than 0 wt. % to about 40 wt. %, and in another embodiment from about 0.5 wt. % to about 30 wt. % of the total emulsion solution. According to another embodiment herein, the surfactant mixture is from 0.5 wt. % to about 20 wt. % of the total emulsion solution. In yet another embodiment, the cationic surfactant is present in the emulsion in an amount that ranges from 0.05 wt. % to about 30 wt. %, and preferably from 0.5 wt. % to about 20 wt. % of the total emulsion, and the nonionic surfactant is present in the emulsion in an amount that ranges from 0.1 wt. % to about 40 wt. %, and preferably from 0.5 wt. % to about 30 wt. % of the total emulsion.

In one embodiment herein, the emulsion-forming amount of surfactant mixture typically ranges in an amount from about 0.01 wt. % to about 30 wt. % of the total composition.

According to one embodiment herein, termination of the polymerization reaction is achieved by the addition of an acid. Typical acids for use in the reaction include those such as acetic acid, hydrochloric acid, sulfuric acid and the like.

The acids are added to the emulsion in an amount that ranges from 0.01 wt. % to about 30 wt. % of the total emulsion and preferably from 0.1 wt. % to about 10 wt. % of the total emulsion.

According to one embodiment herein, crosslinkers, or crosslinking agents, include a blocked isocyanate, organofunctional silane, epoxy resin, or mixtures thereof. Preferably, the crosslinker can be used in an aqueous emulsion.

According to one embodiment herein, the crosslinker includes a blocked isocyanate. It has been found herein that blocked isocyanates can release free isocyanate groups under high temperature conditions (such as those encountered during textile treatment) that can further react with amino and hydroxyl groups on the silicone to form coherent, crosslinked membranes on the textile fibers. In addition, the isocyanates can also react with hydroxyl groups on the textiles like cotton fabrics, to impart superior home laundry washing durability.

Suitable isocyanates include diisocyanates and polyisocyanates. Aliphatic or aromatic polyisocyanates are preferable for improved weatherability. Polyisocyanates which can be employed are all the known polyisocyanates based on aliphatic, cycloaliphatic and aromatic diisocyanates and having an isocyanate content of 0.5 wt. % to about 50 wt. %, preferably about 3 wt. % to about 30 wt. %, and more preferably about 5 wt. % to about 25 wt %. Suitable polyisocyanates include, for example, those based on toluene diisocyanate (TDI) such as 2,4- and 2,6-diisocyanatotoluene, diphenylmethane diisocyanate (MDI) such as diphenylmethane-2,4'- and/or -4,4'-diisocyanate, 1,6-hexamethylene diisocyanate (HDI), isophorone diisocyanate (IPDI) such as 1-isocyanato-3,3,5-trimethyl-5-isocyanatomethylcyclohexane, dicyclohexylmethane diisocyanate ($H_{12}$MDI), 1,4-diisocyanatobutane, 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 4,4'-diisocyanatodicyclohexylmethane, 1-isocyanato-1-methyl-4(3)isocyanato-methylcyclohexane (IMCI), bis-(isocyanatomethyl)-norbornane, 1,3- and 1,4-bis-(2-isocyanato-prop-2-yl)-benzene (TMXDI), 1,5-diisocyanatonaphthalene, 2,4'-, 4,4'-diisocyanatodiphenylmethane, and their biurets, trimers and polymers thereof. Mixtures of polyisocynates can be used.

Suitable blocking groups employed for blocking diisocyanates and polyisocyanates include metal bisulfite, diethyl malonate (DEM) 3,5-dimethylpyrazole (DMP), methylethylketoxime (MEKO) e-caprolactam (e-CAP), diisopropylamine, dimethylpyrazole, methyl ethyl ketoxime (butanone oxime), malonic acid diethyl ester, secondary amines and triazole and pyrazole derivatives.

Suitable crosslinking agents include melamines. Suitable melamines include commercial grade hexamethoxymethylmelamines, such as, for example, CYMEL 303, CYMEL 370 and CYMEL 325 crosslinkers (products of Cytec), and Resimene CE-7103 (product of UCB Chemical).

Suitable crosslinkers include organofunctional silanes, for example, copolymers of unsaturated monomers (e.g., acrylates) and alkoxysilanes having olefin or acrylate functionality (e.g., vinylalkoxysilanes or acrylatoalkoxysilanes).

According to another embodiment herein, optional ingredients include solvents such as alkanols and polyhydric alcohols, pH buffering agents such as strong or weak acids e.g. HCl, $H_2SO_4$, phosphoric, benzoic or citric acid (the pH of the compositions are preferably less than 5.0), rewetting agents, viscosity modifiers such as electrolytes, for example calcium chloride, anti-gelling agents, perfumes, perfume carriers, fluorescers, colorants, hydrotropes, antifoaming agents, antiredeposition agents, enzymes, optical brightening agents, opacifiers, stabilizers such as guar gum and polyethylene glycol, emulsifiers, anti-shrinking agents, anti-wrinkle agents, fabric crisping agents, anti-spotting agents, soil-release agents, germicides,-linear or branched silicones, fungicides, biocides, anti-oxidants, anti-corrosion agents, preservatives, pigments, dyes, bleaches and bleach precursors, drape imparting agents, antistatic agents fillers, thickeners, and ironing aids. These optional ingredients, if added, are each present in known and conventional amounts as used in the art.

The amount of water used in the preparation of aqueous emulsions of polysiloxane (a) and crosslinker (b) should be adequate to give either an oil-in-water emulsion or a water-in-oil emulsion having good stability. The amount of water should be in the range of from about 20 parts by weight (pbw) to about 2000 pbw, preferably from about 100 pbw to about 500 pbw, per 100 pbw of the total amount of polysiloxane (a) and crosslinker (b).

The aqueous emulsions can be prepared by merely mixing and agitating the compounds disclosed above with a stirrer, such as a homomixer or homogenizer. Polysiloxane (a), crosslinker (b), surface active agent(s), and water can be introduced together into a vessel in a specific amount, or as a pre-mixture of polysiloxane (a) and crosslinker (b) and surface-active agent(s) followed by the addition of water. Thus, an aqueous emulsion of polysiloxane (a), crosslinker (b), and surface active agent(s) of the oil-in-water or water-in-oil type are easily obtained to provide the desired performance as a fiber/fabric-finishing agent. The length of time for agitation depends upon the balance of the interfacial properties between the compounds, the surface-active agents, and water. Commercially available agitation apparatus are readily available for this purpose.

The aqueous emulsions of the present invention prepared as described above can be diluted with water to a desired active level and applied onto a fiber or fabric textile by spraying, dipping, padding, kiss roll, and the like. Removal of any excess emulsion can be achieved by using a mangle, centrifugal separator, or the like to control the amount of liquid absorbed by the textile. Drying can be effected with or without heat. Depending upon the particular textile being treated, when drying is performed with heat, the temperature is usually in the range from about 70° C. to about 180° C., and the time of heating from about 1 to about 30 minutes. After removal of excessive emulsion, subsequent heating to promote curing is normally required. Effective cure temperatures are in the range from about 120° C. to about 200° C. for about 1 to about 30 minutes. Upon curing, the resultant condensation product imparts durability, water repellency, and softness to the textile.

The amount of the aqueous emulsion that a textile absorbs is usually in the range of from about 0.1 wt. % to about 5 wt. %, calculated by the total amount of polysiloxane (a) and crosslinker (b). It may be desirable to prepare an emulsion having a higher polymer content in order to reduce shipping and/or handling costs and then to dilute the emulsion with water immediately prior to use. The polymer content of the aqueous emulsions of the present invention can range from about 10 wt. % to about 80 wt. %, preferably, about 20 wt. % to about 40 wt. %, based on the total weight of the aqueous emulsion.

Other additives typically employed in treating textiles can be included in the emulsions or applied separately to the textiles. Such additives can include, for example, durable press resins, curing catalysts, preservatives or biocides, water-soluble pigments or dyes, fragrances, fillers, pH adjusters, and antifoams or defoamers.

According to one embodiment herein, the present invention provides a textile possessing the crosslinked polysiloxane-containing composition described above. The aqueous emulsions comprising polysiloxane (a) and crosslinker (b) and a catalyst are useful as finishing treatments for fabrics having various types of fibers, including natural fibers, synthetic fibers, and blends thereof. For example, excellent water repellency is imparted to the textiles comprising synthetic fibers, such as polyester, acrylic, nylon, aramid, and the like, as well as to textiles comprising various kinds of natural fibers, such as cotton, silk, and wool, by applying the aqueous emulsions of the present invention. Materials that can be treated include filaments, rovings, threads, woven and non-woven fabrics, knit cloths, leather and the like. Furthermore, the compositions of the present invention can also be applied to inorganic fibers, such as glass fibers and carbon fibers.

According to another embodiment herein, a process of treating a textile is provided comprising (a) applying at least one crosslinkable polysiloxane-containing composition to a textile; and, (b) subjecting the at least one crosslinkable polysiloxane-containing composition to crosslinking conditions to provide a crosslinked polysiloxane-containing composition on the textile.

In order to demonstrate the practice of the present invention, the following examples were prepared and tested as set forth below. These examples should not, however, be construed as limiting the present invention.

In each of the following examples, the amount of each component used is expressed as a weight percent as based upon the final product produced.

EXAMPLES

AATCC Test Method 22-2001, Water Repellency: Spray Test

The evaluation of water repellency of textile fabric was performed according to the cited AATCC standard Spray Test method.

A spray rating of 100 means no sticking or wetting of the upper surface (best water repellency).

A spray rating of 90 means slightly random sticking or wetting of the upper surface.

A spray rating of 80 means wetting of upper surface at spray point.

A spray rating of 70 means partial wetting of whole of upper surface.

A spray rating of 50 means complete wetting of whole upper surface.

A spray rating of 0 means complete wetting of whole upper surface and lower surfaces.

Water Repellency Durability Test

The durability of water repellency of textile fabric was evaluated by measuring the water repellency of the textile fabric after being washed according to the AATCC Guideline for Standardization of Home Laundry Test Conditions (AATCC Technical Manual p. 362). Better durability of water repellency is interpreted by the higher of the spray rating with higher wash cycles.

Example 1

Preparation of composition comprising at least one polysiloxane of formula (1) and crosslinker:

0.2 wt. % of a C-15 Secondary alcohol with 15 moles ethylene oxide (Tergitol 15-S-15, available from Dow Chemical), 3 wt. % dialkylammonium chloride (ARQUAD 2C-75, available from Lion Corporation), 5 wt. % polyoxyethylene alkyl ether (nonionic surfactant; Emulgen 1135S-70) and 51.55 wt. % water were charged to a 4-neck 1-liter reactor and mixed for 10 minutes under low agitation (200 rpm) with a radical flow sweep blade. Thereafter, 30 wt. % of a mixture of hexamethylcyclotrisiloxane ($D_3$), octamethylcyclotetrasiloxane ($D_4$), decamethylcyclopentrasiloxane ($D_5$) (DMC) was charged to the vessel and mixed for 50 minutes under high agitation (600 rpm). The pre-emulsion was homogenized with the first pressure 50 kg and the second pressure 500 kg to give an emulsion. Thereafter, 1.96 wt. % of an aqueous solution of 10 wt. % NaOH in water (which acted as a catalyst) was charged into the vessel. The vessel was then slowly heated to 80° C. for five hours, while ring opening and polymerization proceeded. The cooling of the vessel was then begun and the solution of 3 wt. % of N-beta-(aminoethyl)-gamma-aminopropylmethyl dimethoxy silane (a bi-alkoxy silane) in 4 wt. % water was charged. The vessel was brought to room temperature and keep at room temperature for 48 hours, while condensation reaction proceeded. Thereafter, the solution of 1.5 wt. % of gamma-aminopropyl trimethoxy silane (a tri-alkoxy silane) in 4.0 wt. % water was charged and the reaction was kept for 60 minutes at room temperature. Thereafter, 0.2 wt. % of acetic acid was charged to neutralize the solution.

50 wt. % of the above solution was then mixed with 50 wt. % of crosslinker (blocked isocyante BI 7982, Baxenden Chemicals) at room temperature for 30 minutes to give final water repellent product.

Below is the water repellent rating on a cotton woven textile substrate. The water repellency was tested according to AATCC Method 22-2001.

TABLE 1

| | | Water repellent rating | | | |
|---|---|---|---|---|---|
| Sample | Dosage | | washing cycles | | |
| Water Repellent Agent | (g/L) | Initial | 5 | 10 | 20 |
| Example 1 with polysiloxane (1) and crosslinker | 20 | 100 | 95 | 90 | 85 |

Treatment condition: One dip in textile treatment solution, one pass through squeeze and nip rollers, and dried at 160° C. for 3 minutes. As shown in Table 1, a textile treated with a composition of the present invention comprising polysiloxane of formula (1) and crosslinker (b) provided a desirable initial spray rating of 100 before washing.

Comparative Example 2

Preparation of composition comprising at least one polysiloxane of formula (2) and without crosslinker:

0.5 wt. % of a 2,6,8-trimethyl-4-nonyloxypolyethylene oxyethanol (6EO) (available as TERGITOL TMN-6 by DOW CHEMICAL), 3 wt. % Polyethoxylated quaternary ammonium salts (ETHOQUAD C/12, available form Lion Corporation), 2 wt. % alkyleneoxypolyethyleneoxyethanol (C 11-15, secondary alkyl, 15EO) (available as TERGITOL 15-S-15 by DOW CHEMICAL) and 59.34 wt. % water were charged to a 4-neck 1-liter reactor and mixed for 10 minutes under low agitation (200 rpm) with a radical flow sweep blade. Thereafter, 25 wt. % of a mixture of hexamethylcyclotrisiloxane ($D_3$), octamethylcyclotetrasiloxane ($D_4$), decamethylcyclopentrasiloxane ($D_5$) (DMC) was charged to the vessel and mixed for 50 minutes under high agitation (600 rpm). The pre-emulsion was homogenized with the first pressure 50 kg and the second pressure 500 kg to give an emulsion. Thereafter, 1.96 wt. % of an aqueous solution of 10 wt. % NaOH in water (which acted as a catalyst) was charged into the vessel. The vessel was then slowly heated to 80° C. for 5 hours, while ring opening and polymerization proceeded. The cooling of the vessel was then begun and the solution of 3 wt. % of (gamma-aminopropyl)triethoxy-silane (A-1100, available from Momentive Performance Materials, Inc.) in 5 wt. % water was charged. The vessel was brought to room temperature and kept at room temperature for 6 hours. Thereafter, 0.2 wt. % of acetic acid was charged to neutralize the solution.

Below is the water repellent rating on a cotton woven textile substrate. The water repellency was tested according to AATCC Method 22-2001.

TABLE 2

| | | Water repellent rating | | | |
|---|---|---|---|---|---|
| | Dosage | | washing cycles | | |
| Water Repellent Agent | (g/L) | Initial | 5 | 10 | 20 |
| Comparative Example 2 polysiloxane (1) without crosslinker | 20 | 100 | 90 | 80 | 75 |

Treatment condition: One dip in textile treatment solution, one pass through squeeze and nip rollers, and dried at 160° C. for 3 minutes. As shown in Table 2, a textile treated with a composition comprising polysiloxane of formula (1) without a crosslinker provided a desirable initial spray rating of 100 before washing. However, the textile had a lower water repellent rating after 1, 5 and 20 washes compared to the water repellent ratings after 1, 5 and 20 washes of a textile treated with a composition comprising a polysiloxane of formula (1) and crosslinker; see in this regard, Table 1.

Comparative Example 3 and Example 3

Preparation of composition comprising at least one polysiloxane of formula (2) and crosslinker:

A 1000 mL four-necked round-bottomed flask equipped with a mechanical stirrer, a condenser fitted with a nitrogen inlet, a thermocouple and an addition funnel was charged with epoxy monomers: 200 g of polydimethylsiloxane dipropylglycidylether [0.0168 mol, 0.084 milliequivalent/gram (meq/g) epoxy content; 80 wt. % of the total epoxy], 50 g of polypropylene glycol diglycidylether (0.105 mol, 2.1 meq/g epoxy content, 20 wt. % of the total epoxy charge); and amine monomers: 6.48 g of gamma-aminopropyltriisopropoxysilane (0.0246 mol, 50 wt. % of the total amine charge), 6.48 g of diethylaminopropylamine (0.0497 mol, 50 wt. % of the total amine charge) and 262.95 g of isopropanol (50 wt. % total reaction charge). The amine was charged at 22% molar excess to control the molecular weight to an approximate degree of polymerization of 10.

The contents of the flask were stirred and heated to reflux at 85° C. under a nitrogen blanket for 6 to 10 hours. The reaction was deemed complete when the epoxy content was <0.05% by titration (or when identical numbers were obtained from the epoxy and amine titration). The product was subsequently stripped of the solvent by rotovap (at ~120° C. and 2 torr) until the solids content was 80-85 wt. %. This afforded a hazy colorless fluid with a viscosity of 17,000-20,000 cPs (measured with a Brookfield viscometer, spindle #4, at 25° C.), which was stored under a blanket of nitrogen.

Formulation

1) Weighed out 10 g of polymer of formula (2) and 10 g of isopropanol into a beaker.

2) Used a mechanical stirrer mix at ~500 rpm for 5 minutes.

3) Slowly added 10 g of water after which it is allowed to stir for an additional 10 minutes.

4) Added 70 g of acidified water (pH 5) while stirring and allowed it to stir another 10 minutes.

This 10% polymer dispersion was then diluted with water to the required treatment bath concentration.

Below is the water repellent rating on a cotton woven textile substrate. The water repellency was tested according to AATCC 22-2001.

TABLE 3

Water Repellent Rating

| Water Repellent Agent | Dosage (g/L) | Initial | 1 | 5 | 10 |
|---|---|---|---|---|---|
| Comparative Example 3 with polysiloxane (2) without crosslinker | 10 | 90 | 90 | 80 | 70 |
| Example 3 with polysiloxane (2) with crosslinker | 10 | 100 | 100 | 90 | 90 |

Treatment condition: One dip in textile treatment solution, one pass through squeeze and nip rollers, and dried at 160° C. for 3 minutes. As shown in Table 3, a textile treated with a composition comprising polysiloxane of formula (2) without a crosslinker provided an initial spray rating of 90 before washing. A textile treated with a composition of the present invention comprising polysiloxane of formula (2) with a crosslinker provided a superior initial spray rating of 100 and superior water repellent ratings after 1, 5 and 10 washes compared to the composition without crosslinker.

While the invention has been described with reference to a preferable embodiment, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims. All citations referred herein are expressly incorporated herein by reference.

The invention claimed is:

1. A crosslinkable polysiloxane-containing composition comprising:
   (a) a polysiloxane of formula (1):

$$M^A_a D^B_b D^C_c T^D_d T^E_e M^A_a \quad (1)$$

wherein
   $M^A = (OR^1)_y (R^2)_{3-y} SiO_{1/2}$;
   $D^B = R^3_2 SiO_{2/2}$;
   $D^C = R^4 R^5 SiO_{2/2}$;
   $T^D = R^6 SiO_{3/2}$; and,
   $T^E = R^7 SiO_{3/2}$;
   wherein
   $R^1$ is hydrogen or a monovalent hydrocarbon group of 1-20 carbon atoms;
   $R^2$, $R^3$, $R^4$ and $R^6$ each independently is a monovalent hydrocarbon or alkoxy group of 1-60 carbon atoms;
   $R^5$ and $R^7$ each independently is a monovalent hydrocarbon group of 1-60 carbon atoms and substituted with at least one amino and/or oxirane group; and,
   a, b, c, d and e each independently is 0 or a positive integer, provided that $2 \leq a \leq 19$, $1 \leq b \leq 9999$, $1 \leq c \leq 19$, $0 \leq d \leq 9$, $0 \leq e \leq 9$, wherein d+e is greater than or equal to 1, and $0 \leq y \leq 3$; and,
   (b) at least one crosslinker.

2. The composition of claim 1 wherein crosslinker (b) is a blocked polyisocyanate, organofunctional silane or an epoxy resin.

3. The composition of claim 2 wherein the blocked polyisocyanate is at least one member selected from the group consisting of blocked toluene diisocyanate (TDI), blocked methylene diphenyl diisocyanate (MDI), blocked isophorone diisocyanate (IPDI), blocked hexamethylene diisocyanate (HDI), and biurets, trimers or polymers thereof.

4. The composition of claim 1 further comprising (c) at least one catalyst for the crosslinking reaction.

5. The composition of claim 1 wherein in polysiloxane of formula (1), $R^1$ is hydrogen or a monovalent hydrocarbon group of 1-6 carbon atoms; $R^2$, $R^3$, $R^4$ and $R^6$ each independently is a monovalent hydrocarbon or alkoxy group of 1-6 carbon atoms; $R^5$ and $R^7$ each independently is a monovalent hydrocarbon group of 2-20 carbon atoms and substituted with at least one amino and/or oxirane group; $2 \leq a \leq 9$; $25 \leq b \leq 999$; $1 \leq c \leq 9$; $0 \leq d \leq 5$; $1 \leq e \leq 5$ and $0 < y \leq 2$.

6. The composition of claim 1 wherein in polysiloxane of formula (1), $R^1$ is hydrogen or a monovalent hydrocarbon group of 1-4 carbon atoms; $R^2$, $R^3$, $R^4$ and $R^6$ each independently is a monovalent hydrocarbon or alkoxy group of 1-4 carbon atoms; $R^5$ and $R^7$ each independently is a monovalent hydrocarbon group of 2-10 carbon atoms and substituted with at least one amino and/or oxirane group; $2 \leq a \leq 5$; $100 \leq b \leq 999$; $1 \leq c \leq 7$; $0 \leq d \leq 3$; $1 \leq e \leq 3$ and $0 < y \leq 1$.

7. The composition of claim 5 wherein crosslinker (b) is a blocked polyisocyanate organofunctional silane or an epoxy resin.

8. The composition of claim 6 wherein crosslinker (b) is at least one blocked polyisocyanate selected from the group consisting of blocked toluene diisocyanate (TDI), blocked methylene diphenyl diisocyanate (MDI), blocked isophorone diisocyanate (IPDI), blocked hexamethylene diisocyanate (HDI), and biurets, trimers or polymers thereof.

9. A process of treating a textile comprising:
   (a) applying at least one crosslinkable polysiloxane-containing composition of claim 1 to a textile; and,
   (b) subjecting the at least one crosslinkable polysiloxane-containing composition to crosslinking conditions.

10. A process of treating a textile comprising:
    (a) applying at least one crosslinkable polysiloxane-containing composition of claim 2 to a textile; and,
    (b) subjecting the at least one crosslinkable polysiloxane-containing composition to crosslinking conditions.

11. A process of treating a textile comprising:
    (a) applying at least one crosslinkable polysiloxane-containing composition of claim 3 to a textile; and,
    (b) subjecting the at least one crosslinkable polysiloxane-containing composition to crosslinking conditions.

12. A process of treating a textile comprising:
    (a) applying at least one crosslinkable polysiloxane-containing composition of claim 4 to a textile; and,
    (b) subjecting the at least one crosslinkable polysiloxane-containing composition to crosslinking conditions.

13. A process of treating a textile comprising:
    (a) applying at least one crosslinkable polysiloxane-containing composition of claim 5 to a textile; and,
    (b) subjecting the at least one crosslinkable polysiloxane-containing composition to crosslinking conditions.

14. A process of treating a textile comprising:
    (a) applying at least one crosslinkable polysiloxane-containing composition of claim 6 to a textile; and,
    (b) subjecting the at least one crosslinkable polysiloxane-containing composition to crosslinking conditions.

15. A process of treating a textile comprising:
    (a) applying at least one crosslinkable polysiloxane-containing composition of claim 7 to a textile; and,
    (b) subjecting the at least one crosslinkable polysiloxane-containing composition to crosslinking conditions.

16. A process of treating a textile comprising:
    (a) applying at least one crosslinkable polysiloxane-containing composition of claim 8 to a textile; and,
    (b) subjecting the at least one crosslinkable polysiloxane-containing composition to crosslinking conditions.

17. A textile possessing the crosslinked polysiloxane-containing composition of claim 1.

18. A textile possessing the crosslinked polysiloxane-containing composition of claim 2.

19. A textile possessing the crosslinked polysiloxane-containing composition of claim 3.

20. A textile possessing the crosslinked polysiloxane-containing composition of claim 4.

21. A textile possessing the crosslinked polysiloxane-containing composition of claim 5.

22. A textile possessing the crosslinked polysiloxane-containing composition of claim 6.

23. A textile possessing the crosslinked polysiloxane-containing composition of claim 7.

24. A textile possessing the crosslinked polysiloxane-containing composition of claim 8.

* * * * *